J. PETER & T. C. WALTER.
FILTER AND COOLER.
No. 193,722. Patented July 31, 1877.
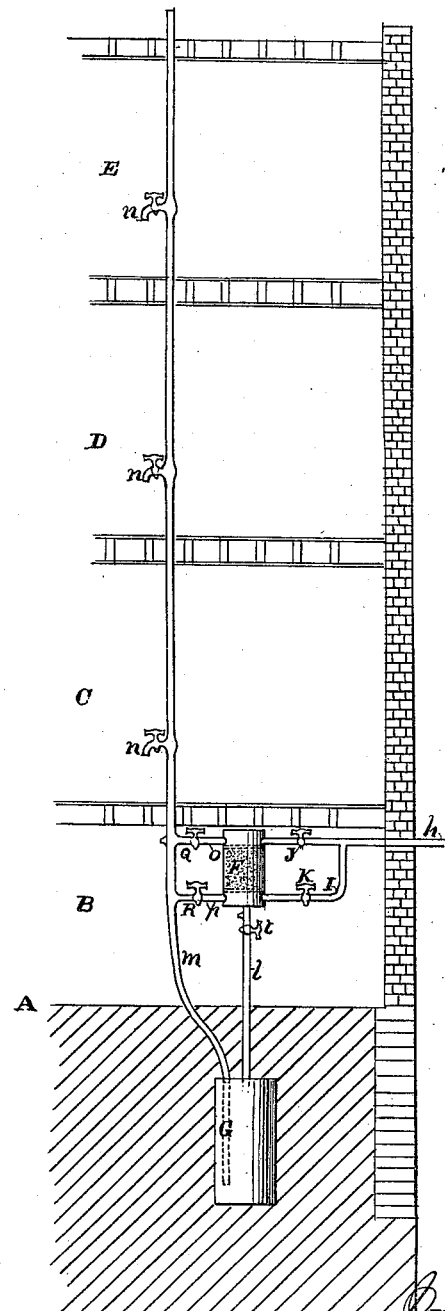
Witnesses
Geo. H. Strong.
Olwyn T. Stacy.
Inventors
Jordan Peter
and Thomas C. Walter
By Dewey & Co.
Att'ys.

UNITED STATES PATENT OFFICE.

JORDAN PETER, OF PETALUMA, AND THOMAS C. WALTER, OF SAN FRANCISCO, CALIFORNIA.

IMPROVEMENT IN FILTERS AND COOLERS.

Specification forming part of Letters Patent No. 193,722, dated July 31, 1877; application filed June 26, 1877.

*To all whom it may concern:*

Be it known that we, JORDAN PETER, of Petaluma, Sonoma county, and THOMAS C. WALTER, of the city and county of San Francisco, State of California, have invented a Water-Cooler and Subterranean Filter; and we do hereby declare the following to be a full, clear, and exact description thereof, reference being had to the accompanying drawings.

Our invention relates to a novel arrangement of a water cooler and filter for supplying pure cold water to houses for drinking and other purposes.

Referring to the accompanying drawings, Figure 1 is a general view of our invention.

Let A represent the ground level. B is the basement or cellar of a house. C D E are three stories of a house or building. F is a water-filter, which we place in the basement or cellar of a house, where it can be readily got at to be renovated or repaired. The cooler G we place in the earth below the filter, by first making an excavation to the desired depth, and placing the cooler-tank in the bottom of the excavation. The water-pipe $h$ leads from the street-main or other source of supply, and enters the filter-vessel near its top. A branch pipe, I, leads from the pipe $h$, and connects with the bottom of the filter-vessel below the filtering material. A cock, J, in the pipe $h$, and another, K, in the pipe I, serve to close the water-passages and direct the water, as will be hereinafter more fully described. A pipe, $l$, leads from the bottom of the filtering-vessel down into the cooling-tank G, and extends down to near its bottom. The pipe has a cock, $t$, near its upper end. Another pipe, $m$, extends from the top of the cooling-tank G up through the house, and has a faucet, $n$, attached to it upon each floor, from which the water can be drawn. A branch pipe, O, connects this pipe $m$ with the top of the filtering-vessel, and another, $p$, connects it with the bottom of the vessel. A cock, Q, in the pipe O, and another, R, in the pipe $p$, serve the same purposes as the cocks J K on the opposite side of the vessel.

After completing the pipe-connections, we fill the earth into the excavation from which it was taken, so as to bury the tank G in the earth, and thus preserve the water at a comparatively uniform temperature. The filter, however, is above ground, where it can be easily got at in order to clear or repair it.

The cocks K Q R are ordinarily kept closed, so that the water will pass through the pipe $h$ into the filtering-vessel above the filtering material. It is then forced by the pressure down through the filtering material, and through the pipe $l$ into the subterranean cooler; thence it rises through the pipe $m$ through the house.

To clean the filter, we close the cocks J $t$ R, so that the water will pass through the pipe I into the bottom of the filtering-vessel, and be forced upward through the filtering material, thus cleaning it.

The chief feature of our invention, however, is the subterranean cooling-vessel, which provides a cheap, simple, and effective device for preserving a uniform temperature, in combination with the above-ground filter.

Having thus described our invention, what we claim, and desire to secure by Letters Patent, is—

The subterranean cooling-tank G, connected by a pipe, $l$, with a filtering-tank, F, and having the pipe $m$ leading through the house, in combination with a series of cleaning-pipes, all combined and arranged to operate substantially as and for the purpose described.

In witness whereof we have hereunto set our hands and seals.

JORDAN PETER. [L. S.]
THOMAS C. WALTER. [L. S.]

Witnesses:
OLWYN T. STACY,
FRANK A. BROOKS.